US010139265B2

(12) United States Patent
Fuss et al.

(10) Patent No.: US 10,139,265 B2
(45) Date of Patent: Nov. 27, 2018

(54) SYSTEM AND METHOD FOR DETERMINING WEIGHT OF FREIGHT UNITS AND BAGGAGE

(71) Applicants: Airbus Operations GmbH, Hamburg (DE); Airbus SAS, Blagnac (FR)

(72) Inventors: Tim Fuss, Hamburg (DE); Diego Alonso-Tabares, Toulouse (FR)

(73) Assignees: AIRBUS OPERATIONS GMBH, Hamburg (DE); AIRBUS SAS, Blagnac (FR)

(*) Notice: Subject to any disclaimer, the term of this patent is extended or adjusted under 35 U.S.C. 154(b) by 217 days.

(21) Appl. No.: 15/230,003

(22) Filed: Aug. 5, 2016

(65) Prior Publication Data

US 2017/0045394 A1    Feb. 16, 2017

(30) Foreign Application Priority Data

Aug. 14, 2015 (EP) .................................. 15181134

(51) Int. Cl.
*G01G 17/00* (2006.01)
*B64D 9/00* (2006.01)
(Continued)

(52) U.S. Cl.
CPC .............. *G01G 17/00* (2013.01); *B64C 1/20* (2013.01); *B64D 9/00* (2013.01); *B64F 1/368* (2013.01);
(Continued)

(58) Field of Classification Search
CPC .... G01G 17/00; B64F 1/368; G06K 7/10366; G06K 7/10; G06Q 10/08
See application file for complete search history.

(56) References Cited

U.S. PATENT DOCUMENTS 6,923,375 B2* 8/2005 Stefani .................. G01G 19/07
  235/462.01
7,198,227 B2* 4/2007 Olin ........................ B64D 9/00
  244/118.1
(Continued)

FOREIGN PATENT DOCUMENTS

GB         2443554 A     5/2008
KR    1020120106929 A    9/2012
(Continued)

OTHER PUBLICATIONS

Mchine translation of KR 2012 0106929.*
European Patent Office, Extended European Search Report for Application No. 15181134.6-1757 dated Mar. 16, 2016.

*Primary Examiner* — Natalie Huls
(74) *Attorney, Agent, or Firm* — Lorenz & Kopf LLP

(57) ABSTRACT

This relates to a System and a method for determining weight of freight units and baggage. Such a system comprises a Unit Load Device (ULD), an internal system of the Unit Load Device (ULD) and a digital memory unit, wherein the internal system is configured for retrieving individual identification and weight data of items within the Unit Load Device (ULD), for calculating a gross weight of the Unit Load Device (ULD) by summing the individual weight data of the items together with empty weight data of the Unit Load Device (ULD) and for storing a list of all identified items based on the identification data as well as the calculated gross weight of the Unit Load Device (ULD) in the digital memory unit.

11 Claims, 2 Drawing Sheets

(51) Int. Cl.
   *B64F 1/36* (2017.01)
   *G06Q 10/08* (2012.01)
   *B64C 1/20* (2006.01)
   *G06F 17/30* (2006.01)
   *G06K 7/10* (2006.01)
   *G06K 7/14* (2006.01)

(52) U.S. Cl.
   CPC ... *G06F 17/30864* (2013.01); *G06K 7/10366* (2013.01); *G06K 7/1413* (2013.01); *G06Q 10/08* (2013.01)

(56) References Cited

U.S. PATENT DOCUMENTS

| | | | | |
|---|---|---|---|---|
| 8,185,234 B2* | 5/2012 | Tietjen | ............ | B64D 9/00 235/384 |
| 8,469,310 B2* | 6/2013 | Glaser | ............ | B64C 1/00 220/1.5 |
| 8,669,861 B1* | 3/2014 | Meyers | ............ | G06Q 10/08 340/539.1 |
| 2006/0086790 A1* | 4/2006 | Sloan | ............ | G06K 7/10445 235/384 |
| 2008/0047282 A1 | 2/2008 | Bodin et al. | | |
| 2008/0061125 A1* | 3/2008 | Langlois | ............ | G06Q 50/28 235/376 |
| 2010/0213313 A1* | 8/2010 | Reed | ............ | B64D 9/00 244/118.1 |
| 2010/0270318 A1* | 10/2010 | Dagher | ............ | B65D 88/14 220/660 |
| 2015/0178675 A1* | 6/2015 | Perez | ............ | G06Q 10/0833 705/333 |
| 2016/0239802 A1* | 8/2016 | Burch | ............ | H04W 4/70 |

FOREIGN PATENT DOCUMENTS

| | | | | |
|---|---|---|---|---|
| WO | | 2010009899 A2 | 1/2010 | |
| WO | | 2010127733 A2 | 11/2010 | |
| WO | WO | 2015013026 A2 * | 1/2015 | ............ H04W 4/008 |

* cited by examiner

SYSTEM AND METHOD FOR DETERMINING WEIGHT OF FREIGHT UNITS AND BAGGAGE

CROSS-REFERENCE TO RELATED APPLICATION

This application claims priority to European Patent Application No. 15 181 134.6, filed Aug. 14, 2015, which is incorporated herein by reference in its entirety.

TECHNICAL FIELD

The embodiments described herein relate to the field of logistics and cargo tracking. More specifically, the embodiment relates to a system and a method for determining weight of freight respectively freight units and baggage, e.g. so called Unit Load Devices (ULDs), in an aircraft. ULDs are typically containers or pallets.

BACKGROUND

In addition, other objects, desirable features and characteristics will become apparent from the subsequent summary and detailed description, and the appended claims, taken in conjunction with the accompanying drawings and this background.

U.S. Pat. No. 7,198,227 B2 discloses an aircraft cargo locating system for locating a plurality of ULDs in an aircraft, each ULD having a wireless tag, e.g. an Radio Frequency Identification (RFID) tag, affixed to it. The system includes a plurality of tag readers, e.g. RFID readers, for reading the wireless tags, and a processor coupled to the tag readers. The processor is programmed to receive tag information from the plurality of tag readers and calculate a location and the weight of each of the ULDs in the aircraft from the tag information. The system is also able to calculate weight and balance parameters to assist in the loading process. However, the system disclosed by U.S. Pat. No. 7,198,227 B2 does not address the content of the ULDs, the individual weight of said content and its individual position.

SUMMARY

It is an object of the present embodiment to provide an alternative system and method for determining weight of freight or freight units and baggage in an aircraft, wherein said system particularly allows an automatic calculation of the ULD gross weight.

The problem is solved by the subject matter according to the independent claims. The dependent claims, the following description and the drawings show preferred embodiments.

The inventive system for determining weight of freight units and baggage according to claim 1 comprises at least one Unit Load Device (ULD), an internal system of the ULD and a digital memory unit. The internal system is configured for retrieving individual identification and weight data of items within the ULD, for calculating a gross weight of the ULD by summing the individual weight data of the items together with empty weight data of the ULD and for storing a list of all identified items based on the identification data as well as the calculated gross weight of the ULD in the digital memory unit.

The inventive system is preferably installed in an aircraft and allows an automatic calculation respectively assembly of the ULD gross weight data. Alternative applications of the inventive system are also outside of an aircraft, e.g. in an airport terminal, in an airport apron area or in a terminal baggage sorting area. The ULD internal system can retrieve the individual weight data of all items, e.g. pieces of luggage or declared and tagged commercial cargo items, loaded into the ULD and can sum these individual weight data together with the ULD empty weight. In particular such a "smart" container as the ULD can read digital information of all its content, e.g. identification (ID) and weight data, to collect all individual ID's and weights. Identity data can for example contain additional information about the piece of freight respectively baggage, e.g. living animals or dangerous goods. The ULD then can sum all individual weights and add its empty weight to calculate the gross weight. The number representing the calculated gross weight can be stored on the digital memory unit together with a list of all identified item-IDs. Preferably, the digital memory unit is configured for being read wirelessly. Possible use cases for the inventive system can be e.g. standard luggage operations where bags are placed into containers or pallets (ULDs) prior to transport to an aircraft. A predefined target gross weight for the ULDs can be provided to luggage handlers so that the weight is well distributed over the required amount of ULD's. Another use case for the inventive system are future self-servicing kiosks which may feature loading of bags by passengers wherein ULD's need to be able to detect which bags are placed inside.

According to an embodiment the internal system is configured for tracking a location of each of the items within the ULD. Such a location can be the recognition of a given position inside the ULD. For example, a ULD can comprise several partitions or sub-compartments in which an item, e.g. a piece of luggage, can be received. Such a partition can be seen as a possible location of an item and the internal system can be configured for recognizing in which partition a respective item is received. Respective location data can be stored in the digital memory unit, e.g. in the aforementioned list. The data representing the calculated gross weight as well as the individual weight of the items within the ULD and the location respectively position of said items within the ULD can be used for weight and balance calculations of the aircraft.

The ULD can comprise an RFID reader or at least one RFID reader for reading RFID tags of the items within the Unit Load Device. Technologies like RFID are continuously introduced into freight processes. Passenger luggage can be weighed at a check-in desk or a self-service-check-in desk and data representing the measured weight can be written on a bag-tag, e.g. an RFID tag. Such an RFID tag can particularly be a permanent RFID tag of a piece of baggage or a disposable RFID tag for each baggage tagged at an airport. The RFID reader of the ULD can read such data written on the RFID tag. The ULD can further comprise a shielding element which is adapted to ensure that the RFID reader only reads information of RFID tags inside of the ULD. The shielding element is adapted for blocking of signals coming from RFID tags from other ULDs.

According to a further embodiment the internal system is configured for transmitting the calculated gross weight to another device, e.g. a portable device which can display the calculated gross weight, via a digital interface. The gross weight can then be used for weight and balance systems of the aircraft. Also, the internal system can be configured for transmitting the position of each of the items within the ULD to another device, e.g. a portable device which can display the position of each of the items within the ULD, via a digital interface. The position of each of the items within the ULD can then also be used for weight and balance systems of the aircraft.

Preferably the ULD comprises an RFID tag and a microprocessor. The list of all identified items based on the identification data, the individual weight of said items as well as the calculated gross weight of the ULD can be stored on the RFID tag. The microprocessor unit can e.g. be used for calculating said gross weight. The tag can be read e.g. by an RFID reader of a portable device or another system.

According to another embodiment the ULD is configured to be supplied with power from an infrastructure of an aircraft, e.g. via contactless respectively wireless power, an induction system or plugs. Such a power supply enables the ULD being compact and simple in its structure.

Further, the ULD can comprise a specific antenna system. The antenna system can be used for transmitting the data stored on the digital memory unit to another device, e.g. a portable device. These data can then be used for weight and balance systems of the aircraft.

According to another embodiment the ULD comprises a barcode reader. The barcode reader can be used for reading barcodes provided on the items within the ULD, wherein said barcodes can contain identification and weight information of the individual items. Preferably, the barcode scanner is configured for transmitting such information to the internal system of the ULD such that the internal system can identify the items within the ULD and calculate the gross weight of the ULD.

Also, the ULD can comprise a communication unit for querying databases. Passenger luggage can be weighed at a check-in desk or a self-service-check-in desk and data representing the measured weight can be stored in a database, e.g. a central database. The communication unit of the ULD can access such data stored in the central database and use them for identifying the items within the ULD and calculating the gross weight of the ULD.

According to still another embodiment the internal system is configured to receive trigger signals to activate and deactivate the RFID reader of the internal system. Such trigger signals can be sent e.g. from an airport, an airline or an aircraft and received e.g. by an antenna of the internal system. This embodiment provides a way of controlling the RFID reader so that is especially not working respectively automatically turned off during an aircraft flight phase which already starts on ground. In particular, the internal system can receive a turn-off trigger signal when a flight phase starts and a turn-on trigger signal when a flight phase is over. This particularly enables to save energy and costs and to reduce radiations during flight.

Further, the infrastructure of the aircraft can comprise an induction system for supplying the Unit Load Device (ULD) with power wherein the induction system is configured to transmit the trigger signals. By this way the induction system for charging the ULD is also used for transmitting information. Also different means of the infrastructure of the aircraft for supplying power to the ULD, e.g. an aircraft power line and the aforementioned plug, may be used for transmitting the trigger signals.

An inventive method for determining weight of freight and baggage comprises the steps of providing an inventive system as described above, retrieving individual identification and weight data of items within a ULD by using an internal system of the ULD, calculating a gross weight of the ULD by summing the individual weight data of the items together with empty weight data of the ULD by using the internal system and storing a list of all identified items based on the identification data as well as the calculated gross weight of the ULD in a digital memory unit of the system by using the internal system.

Another inventive system for determining weight of freight and baggage comprises an aircraft cargo hold, an internal system of the aircraft cargo hold, and a digital memory unit. The internal system is configured for retrieving individual identification data and weight data of items within the aircraft cargo hold, for calculating a gross weight of the items within the aircraft cargo hold by summing the individual weight data of the items and for storing the calculated gross weight of the items within the aircraft cargo hold in the digital memory unit. According to this inventive system, the aircraft cargo hold acts as a ULD. This inventive system can especially be used considering "bulk loading" for tracking and locating baggage not being stored in ULDs inside of the aircraft.

Another inventive method for determining weight of freight and baggage comprises the steps of providing an inventive system as described in the last paragraph, retrieving individual identification data and weight data of items within an aircraft cargo hold by using an internal system of the inventive system, calculating a gross weight of the items within the aircraft cargo hold by summing the individual weight data of the items by using the internal system and storing the calculated gross weight of the items within the aircraft cargo hold in the digital memory unit by using the internal system.

BRIEF DESCRIPTION OF THE DRAWINGS

The various embodiments will hereinafter be described in conjunction with the following drawing figures, wherein like numerals denote like elements, and.

The illustrations in the figures are merely diagrammatic and not to scale.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
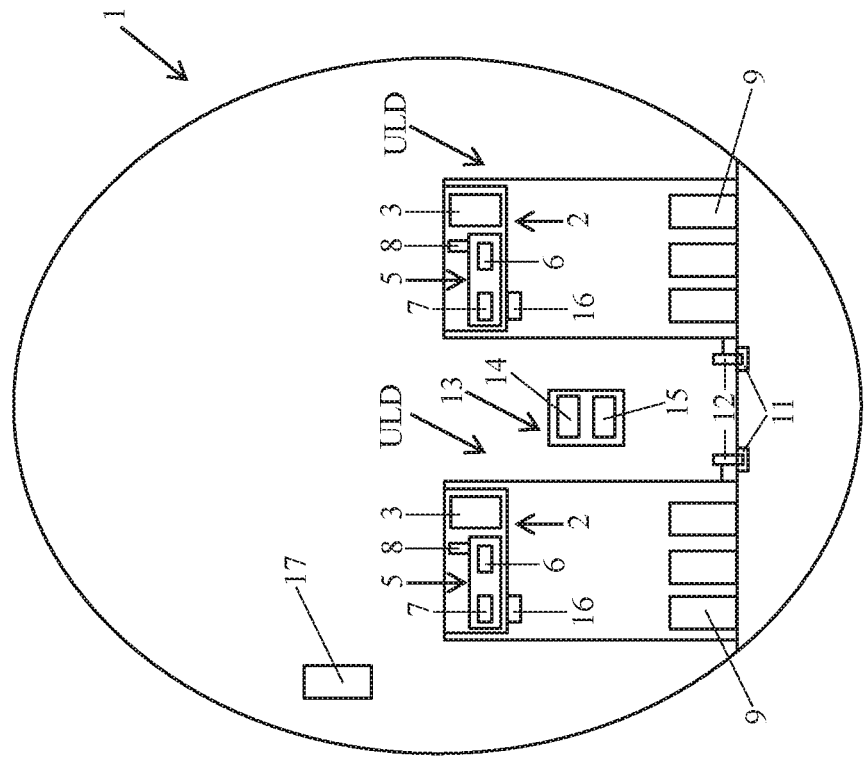
FIG. 1 shows a schematically cross sectional view of an aircraft cargo compartment with an embodiment of an inventive system for determining weight of freight units and baggage.

FIG. 1 shows a part of an aircraft cargo compartment 1 having a system for determining weight of freight units. The system comprises two Unit Load Devices ULDs. Each Unit Load Device ULD comprises an internal system 2 having a microprocessor unit 3, a ULD RFID reader 4 and a ULD RFID tag 5 with a digital memory unit 6, a microcontroller 7 and a digital interface in form of an antenna system 8.

Each of the Unit Load Devices ULDs contains three pieces of luggage 9 which are, although for reasons of simplicity not shown, not identical particularly with respect to size and weight. Each of the pieces of luggage 9 comprises a bag tag in form of a luggage RFID tag 10 which can have an identical or at least similar structural setup like the ULD RFID tags 5. For purposes of clarity only each one piece of luggage 9 and one luggage RFID tag 10 is indicated with a reference sign and the luggage RFID tags 10 are not shown in further detail. The pieces of luggage 9 have been weighed at a check-in desk (not shown) and data representing their identity and their measured weight has been written on the respective luggage RFID tags 10. The ULD RFID readers 4 can read the data written on the luggage RFID tags 10 and store these data in their respective digital memory unit 6. Thus, the ULD RFID readers 4 of the internal systems 2 are configured for retrieving individual identification and weight data of the pieces of luggage 9 within the Unit Load Devices ULDs. The Unit Load Devices ULDs also each comprise a shielding element (S) which is adapted to ensure that the RFID readers 4 only read information of RFID tags 10 inside of its respective Unit Load Device ULD. The shielding element (S) is adapted for blocking of signals coming from RFID tags 10 from the respective other Unit Load Device ULD.

Further, the Unit Load Devices ULDs are each connected to a power supply 11 of the aircraft cargo compartment 1 via a plug 12, alternatively via a battery or further alternatively via an electric charging induction system of the aircraft floor. The internal systems 2 are further configured to receive trigger signals to deactivate their respective ULD RFID readers 4 during a flight phase (turn-off trigger signal) of the aircraft and to activate the ULD RFID reader 4 again when the flight phase is over (turn-on trigger signal). In the case of an induction system for supplying the Unit Load Device ULD with power such an induction system can be configured to transmit such trigger signals. By this way the induction system for charging the Unit Load Device ULD is also used for transmitting information.

Each internal system 2 can calculate a gross weight of its Unit Load Device ULD by summing the individual weight data of the pieces of luggage 9 within the respective Unit Load Device ULD together with empty weight data of the respective Unit Load Device ULD. Said empty weight data of the respective Unit Load Device ULD can be e.g. stored in the digital memory unit 6 of the ULD RFID tag 5 or in a digital memory unit of the microprocessor unit 3 which is used for said calculation of the ULD gross weight.

Also, the internal systems 2 can store a list of all identified pieces of luggage 9 based on the identification data as well as the calculated gross weight of the Unit Load Devices ULDs in the digital memory unit 6 of the respective ULD RFID tag 5. Additionally, the ULD RFID readers 4 can track a location of each of the pieces of luggage 9 within the Unit Load Devices ULDs by tracking the position of the luggage RFID tags 10. Respective position data can also be stored in the memory units 6 of the ULD RFID tags 5.

The antenna systems 8 of the ULD RFID tags 5 can transmit data stored within the digital memory units 6 to a portable device 13 having a display 14 for visualizing information represented by said data, e.g. identification, position and weight data of the pieces of luggage 9 and the Unit Load Devices ULDs. The portable device 13, e.g. a laptop, mobile phone, a smartphone, a tablet pc or similar, can be used by a not shown user, e.g. a crew member of an aircraft or a load handler. The portable device 13 comprises a device RFID reader 15 which can retrieve said data from the ULD RFID tags 5. The portable device 13 can further comprise Google® glass like devices for visualizing information for an operator of the device.

Figure 2:
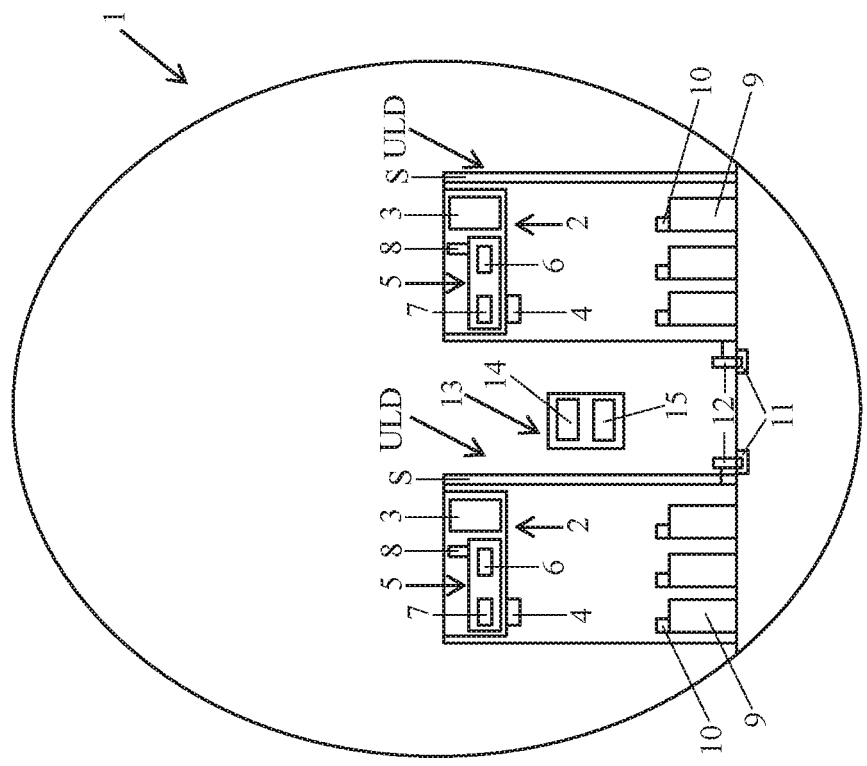
FIG. 2 shows a schematically cross sectional view of an aircraft cargo compartment with another embodiment of an inventive system for determining weight of freight units and baggage.

FIG. 2 shows a part of an aircraft cargo compartment 1 having a slightly different embodiment of a system for determining weight of freight units. The system as per FIG. 2 particularly differs from the system as per FIG. 1 in that the internal systems 2 of the Unit Load Devices ULDs do not comprise ULD RFID readers and that the pieces of luggage 9 do not comprise luggage RFID tags. Instead, the Unit Load Devices ULDs each comprise a communication unit 16 to query a database which is implied with reference number 17. The pieces of luggage 9 have been weighed at a check-in desk (not shown) and data representing their identity and their measured weight has been written into and stored in the database 17. The communication units 16 can access the data stored in the database 17, calculate the gross weight of the respective Unit load device by summing the individual weight data of the pieces of luggage 9 within the respective Unit Load Device ULD together with empty weight data of the respective Unit Load Device ULD and store these data in their respective digital memory unit 6.

Figure 3:
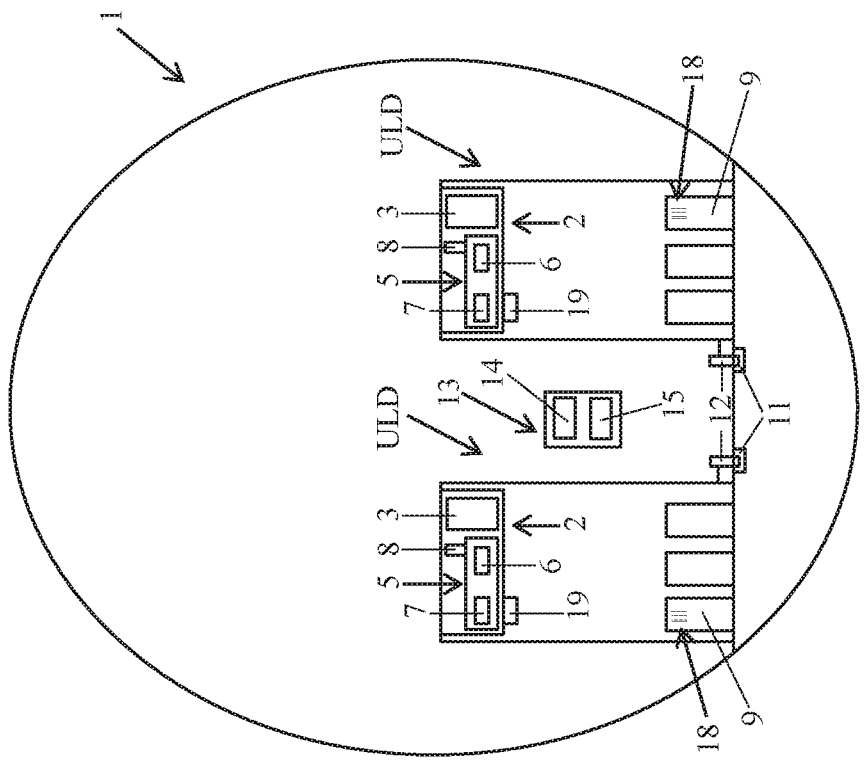
FIG. 3 shows a schematically cross sectional view of an aircraft cargo compartment with still another embodiment of an inventive system for determining weight of freight units and baggage.

FIG. 3 shows a part of an aircraft cargo compartment 1 having another slightly different embodiment of a system for determining weight of freight units. The system as per FIG. 3 particularly differs from the system as per FIG. 1 in that the internal systems 2 of the Unit Load Devices ULDs do not comprise ULD RFID readers and that the pieces of luggage 9 do not comprise luggage RFID tags. Instead, the pieces of luggage each comprise a barcode 18 and the Unit Load Devices ULDs each comprise a barcode scanner 19. The pieces of luggage 9 have been weighed at a check-in desk (not shown) and data representing their identity and their measured weight has been incorporated into said barcodes 18. The barcode scanner 19 can scan the barcodes 18, thereby retrieve the data incorporated in these barcodes 18, calculate the gross weight of the respective Unit load device by summing the individual weight data of the pieces of luggage 9 within the respective Unit Load Device ULD together with empty weight data of the respective Unit Load Device ULD and store these data in the respective digital memory unit 6.

Figure 4:
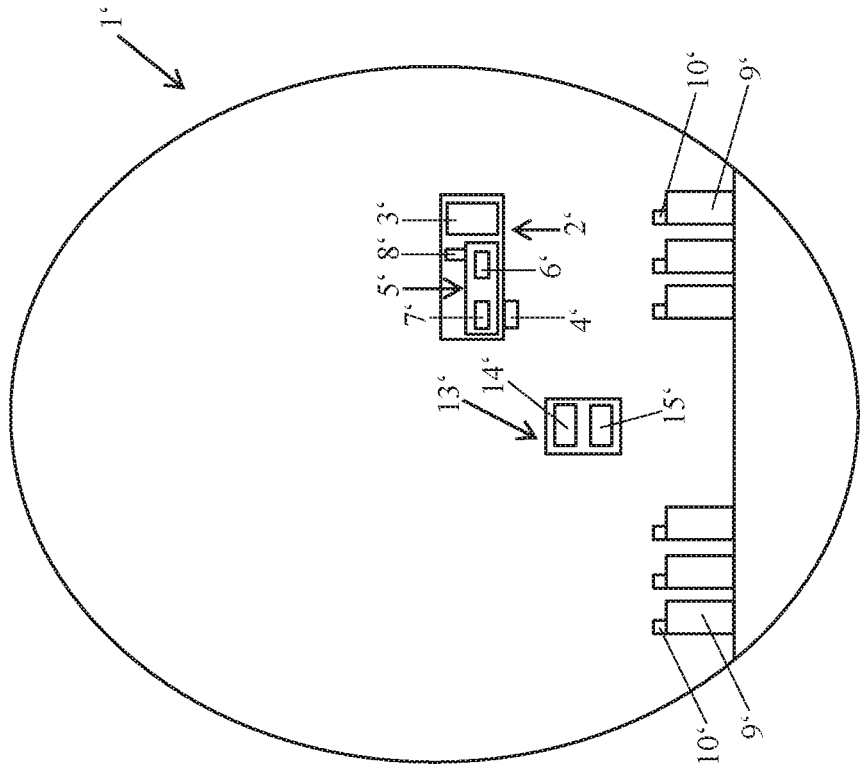
FIG. 4 shows a schematically cross sectional view of an aircraft cargo compartment with an embodiment of another inventive system for determining weight of freight units and baggage.

FIG. 4 shows a system comprising an aircraft cargo hold in the form of an aircraft cargo compartment 1'. The system comprises an internal system 2' having a microprocessor unit 3', an internal system RFID reader 4' and an internal system RFID tag 5' with a digital memory unit 6', a microcontroller 7' and a digital interface in form of an antenna system 8'. The aircraft cargo compartment 1' contains three pieces of luggage 9' which are—although for reasons of simplicity not shown—not identical particularly with respect to size and weight. Each of the pieces of luggage 9' comprises a bag tag in form of a luggage RFID tag 10' which can have an identical or at least similar structural setup like the internal system RFID tags 5'. For purposes of clarity only each one piece of luggage 9' and one luggage RFID tag 10' is indicated with a reference sign and the luggage RFID tags 10' are not shown in further detail. The pieces of luggage 9' have been weighed at a check-in desk (not shown) and data representing their identity and their measured weight has been written on the respective luggage RFID tags 10'. The internal system RFID readers 4' can read the data written on the luggage RFID tags 10' and store these data in their respective digital memory unit 6'. Thus, the internal system RFID readers 4' are configured for retrieving individual identification and weight data of the pieces of luggage 9' within the aircraft cargo compartment 1'. The pieces of luggage 9' can be identified and located per section/compartment of a cargo hold of the aircraft.

The internal system 2' further can calculate a gross weight of the pieces of luggage 9 by summing the individual weight data of the pieces of luggage 9 within the aircraft cargo compartment. The microprocessor unit 3' is used for the calculation of said gross weight. Also, the internal system 2' can store a list of all identified pieces of luggage 9' based on the identification data as well as the calculated gross weight of the pieces of luggage 9' in the digital memory unit 6' of the internal system RFID tag 5'. Additionally, the internal system RFID readers 4' can track a location of each of the pieces of luggage 9' within the aircraft cargo compartment 1' by tracking the position of the luggage RFID tags 10'. Respective position data can also be stored in the memory units 6' of the internal system RFID tags 5'. The antenna system 8' can transmit data stored within the digital memory unit 6' to a portable device 13' having a display 14' for visualizing information represented by said data, e.g. identification, position and weight data of the pieces of luggage 9' and the calculated gross weight of the pieces of luggage 9'. The portable device 13', e.g. a laptop, mobile phone, a smartphone, a tablet pc or similar, can be used by a not shown user, e.g. a crew member or a load handler. The portable device 13' comprises a device RFID reader 15' which can retrieve said data from the internal system RFID tags 5. The portable device 13 can further comprise Google® glass like devices for visualizing information for an operator of the device.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A system for determining weight of freight units and baggage, the system comprising:
    a Unit Load Device configured to be supplied with power from an infrastructure of an aircraft, the Unit Load Device comprising an RFID reader to read RFID tags of items within the Unit Load Device;
    an internal system of the Unit Load Device, wherein the internal system is configured to receive trigger signals to activate and deactivate the RFID reader, wherein the infrastructure of the aircraft comprises an induction system to supply the Unit Load Device with power, and wherein the induction system is configured to transmit the trigger signals; and
    a digital memory unit;
    wherein the internal system is configured for
    retrieving individual identification and weight data of items within the Unit Load Device,
    calculating a gross weight of the Unit Load Device by summing the individual weight data of the items together with empty weight data of the Unit Load Device, and
    storing a list of all identified items based on the identification data as well as the calculated gross weight of the Unit Load Device in the digital memory unit.

2. The system according to claim 1, wherein the internal system is configured for tracking a location of each of the items within the Unit Load Device.

3. The system according to claim 2, wherein the internal system is configured for transmitting the position of each of the items within the Unit Load Device to another device via a digital interface.

4. The system according to claim 1, wherein the internal system is configured for transmitting the calculated gross weight to another device via a digital interface.

5. The system according to claim 1, wherein the Unit Load Device comprises an RFID tag and a microprocessor unit.

6. The system according to claim 1, wherein the Unit Load Device comprises a specific antenna system.

7. The system according to claim 1, wherein the Unit Load Device comprises a barcode reader.

8. The system according to claim 1, wherein the Unit Load Device comprises a communication unit for querying databases.

9. A method for determining weight of freight and baggage comprising the steps of:
    providing a system according to claim 1;
    supplying power to the Unit Load Device through the induction system;
    transmitting a trigger signal to the Unit Load Device;
    retrieving individual identification and weight data of items within a Unit Load Device by using an internal system of the Unit Load Device;
    calculating a gross weight of the Unit Load Device by summing the individual weight data of the items together with empty weight data of the Unit Load Device by using the internal system; and
    storing a list of all identified items based on the identification data as well as the calculated gross weight of the Unit Load Device in a digital memory unit of the system by using the internal system.

10. A system for determining weight of freight and baggage, the system comprising an aircraft cargo hold, an internal system of the aircraft cargo hold, and a digital memory unit,
    wherein the internal system is configured for
    retrieving individual identification data and weight data of items within the aircraft cargo hold,
    calculating a gross weight of the items within the aircraft cargo hold by summing the individual weight data of the items, and
    storing the calculated gross weight of the items within the aircraft cargo hold in the digital memory unit,
    wherein an infrastructure of the aircraft comprises an induction system for supplying power, and
    wherein the induction system is configured to transmit RFID reader trigger signals to activate and deactivate the retrieving of individual identification data and weight data of items within the aircraft cargo hold.

11. A method for determining weight of freight and baggage comprising the steps of:
    providing a system according to claim 10;
    supplying power from the induction system;
    transmitting an RFID reader trigger signal from the induction system;
    retrieving individual identification data and weight data of items within an aircraft cargo hold by using an internal system;

calculating a gross weight of the items within the aircraft cargo hold by summing the individual weight data of the items by using the internal system; and storing the calculated gross weight of the items within the aircraft cargo hold in the digital memory unit by using the internal system.

\* \* \* \* \*